(12) United States Patent
Asplund et al.

(10) Patent No.: US 9,887,750 B2
(45) Date of Patent: Feb. 6, 2018

(54) METHOD IN A NETWORK NODE AND A NETWORK NODE FOR CONTROLLING COMMUNICATION BETWEEN A RADIO BASE STATION AND USER EQUIPMENTS IN A WIRELESS COMMUNICATION SYSTEM

(71) Applicant: Telefonaktiebolaget L M Ericsson (publ), Stockholm (SE)

(72) Inventors: Henrik Asplund, Stockholm (SE); Svante Bergman, Hägersten (SE); Niklas Wernersson, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 139 days.

(21) Appl. No.: 14/772,314

(22) PCT Filed: Mar. 11, 2013

(86) PCT No.: PCT/SE2013/050216
§ 371 (c)(1),
(2) Date: Sep. 2, 2015

(87) PCT Pub. No.: WO2014/142713
PCT Pub. Date: Sep. 18, 2014

(65) Prior Publication Data
US 2016/0013848 A1    Jan. 14, 2016

(51) Int. Cl.
*H04W 4/00* (2009.01)
*H04B 7/04* (2017.01)
(Continued)

(52) U.S. Cl.
CPC ......... *H04B 7/0465* (2013.01); *H04B 7/0617* (2013.01); *H04W 16/28* (2013.01);
(Continued)

(58) Field of Classification Search
CPC ..... H04B 7/0465; H04B 7/024; H04W 16/28; H04W 72/046; H04W 88/08
(Continued)

(56) References Cited

U.S. PATENT DOCUMENTS

| | | | |
|---|---|---|---|
| 2011/0281600 A1* | 11/2011 | Tanaka | H04B 7/024 455/500 |
| 2012/0093078 A1 | 4/2012 | Perlman et al. | |
| 2012/0320923 A1* | 12/2012 | Vasseur | H04W 40/22 370/400 |

FOREIGN PATENT DOCUMENTS

| | | | |
|---|---|---|---|
| EP | 2161783 A1 | 3/2010 | |
| EP | 2549827 A1 | 1/2013 | |

* cited by examiner

*Primary Examiner* — Faisal Choudhury
(74) *Attorney, Agent, or Firm* — Murphy, Bilak & Homiller, PLLC

(57) ABSTRACT

The present invention relates to a network node and a method performed by the network node for controlling communication between a radio base station, RBS, and user equipments, UEs. The RBS has multiple antennas and uses beam forming when communicating with the UEs. The method comprises obtaining (702) information on an expected first propagation path direction interval between the RBS and UEs served by other neighboring RBSs, and obtaining (704) information on an expected second propagation path direction interval between the RBS and served UEs; defining (706) a first communication power limit for each of a plurality of beams according to the obtained information, the first limit being defined to suppress communication power in the first propagation path direction interval, when the plurality of beams are transmitted; and determining (708) antenna weights for each of the plurality of beams based on the defined first communication power limit.

21 Claims, 9 Drawing Sheets

(51) Int. Cl.
*H04B 7/06* (2006.01)
*H04W 16/28* (2009.01)
*H04W 72/04* (2009.01)
*H04B 7/024* (2017.01)
*H04W 88/08* (2009.01)

(52) U.S. Cl.
CPC .......... *H04W 72/046* (2013.01); *H04B 7/024* (2013.01); *H04B 7/0695* (2013.01); *H04W 88/08* (2013.01)

(58) Field of Classification Search
USPC ........................................................ 370/329
See application file for complete search history.

METHOD IN A NETWORK NODE AND A NETWORK NODE FOR CONTROLLING COMMUNICATION BETWEEN A RADIO BASE STATION AND USER EQUIPMENTS IN A WIRELESS COMMUNICATION SYSTEM

TECHNICAL FIELD

The present invention relates generally to a method in a network node, a network node and a computer program for controlling communication between a radio base station and user equipments in a wireless communication system. More specifically, the present invention relates to controlling communication between a radio base station and user equipments, wherein the radio base station has multiple antennas and uses beam forming when communicating with the UEs.

BACKGROUND

Traditionally, in a wireless communication system, a radio base station, RBS, transmits downlink, DL, signals to user equipments, UEs, by transmitting the DL signals in the entire cell which is covered by the RBS. In other words, the power of a DL signal is transmitted in the entire cell independent of the location of the UE to which the DL signals are to be received, hereinafter called the receiving UE.

To be able to concentrate the power of DL signals in a direction from the RBS towards the receiving UE, a method called beam forming is used. For being able to use beam forming for DL signals, an RBS is equipped with multiple, spatially separated, transmission antennas. The antennas are individually supplied with a weighted amount of the DL signal in such a way that the individual signals, when transmitted from the RBS, experience constructive interference between each other at a transmission angle towards a receiving UE while at other angles the individual signals experience destructive interference. As a result, the overlapping total DL signal will be concentrated in the direction towards the receiving UE.

The advantages of beam forming are, among others, increased signal strength at the location of the receiving UE, This advantage comes as a result of the power concentration in the direction towards the receiving UE. As a result, the signal to interference ratio (SINR) at the receiving UE is improved.

Beam forming may also be used in the uplink. In this case the RBS is equipped with multiple, spatially separated reception antennas.

In traditional RBS transmission techniques, one beam is formed, which beam may be directed to cover the whole cell. Alternatively, the beam is narrower and it is electronically tilted such that it is directed towards the UE currently receiving the transmitted information. The beam may be directed in the azimuth direction or in the elevation direction or in a combination of azimuth and elevation direction.

In another RBS transmission technique called beam selection, the RBS has the ability to transmit a plurality of beams, the plurality of beams being directed, or beam formed, in different directions within the cell covered by the RBS such that each beam covers a part of the cell. The UEs present in the cell are instructed to recommend one of the plurality of transmitted beams for its reception of DL signals, and to report its recommendation to the RBS. The recommendation may be performed based on signal strength measurements performed by the UE.

When communicating between an RBS and UEs using beam forming techniques there is a problem that transmissions originating from the RBS and directed towards UEs may cause interference to other UEs that are communicating with a different RBS. In fact, it is possible that the gain on a system level obtained from using beam forming techniques increasing the received signal level may be lost due to a simultaneous increase in interference towards UEs in a neighboring cell.

SUMMARY

It is an object of the invention to address at least some of the problems and issues outlined above. Moreover, it is an object to decrease interference occurring in neighboring cells due to beam forming communication in a serving cell. It is possible to achieve these objects and others by using a method and an RBS as defined in the attached independent claims.

According to a first aspect, a method performed by a network node is provided for controlling communication between an RBS and UEs in a wireless communication system. The RBS has multiple antennas and uses beam forming when communicating with the UEs. The method comprises obtaining information on an expected first propagation path direction interval between the RBS and UEs served by other neighboring RBSs. The method further comprises obtaining information on an expected second propagation path direction interval between the RBS and served UEs. The method further comprises defining a first communication power limit for each of a plurality of beams according to the obtained information on expected first and second propagation path direction intervals, the first limit being defined to suppress communication power in the first propagation path direction interval, when the plurality of beams are transmitted. The method further comprises determining RBS antenna weights for each of the plurality of beams based on the defined first communication power limit for each of the plurality of beams, such that communication power transmitted by each of the plurality of beams is below the first communication power limit in the first propagation path direction interval, when the plurality of beams are transmitted.

According to a second aspect, a network node is provided configured to control communication between an RBS and user equipments in a wireless communication system. The RBS has multiple antennas and is arranged to use beam forming when communicating with the UEs. The network node comprises an obtaining unit for obtaining information on an expected first propagation path direction interval between the RBS and served UEs, and for obtaining information on an expected second propagation path direction interval between the RBS and UEs served by other neighboring RBSs. The network node further comprises a defining unit for defining a first communication power limit for each of a plurality of beams according to the obtained information on expected first and second propagation path direction intervals, the first limit being defined to suppress communication power in the first propagation path direction interval, when the plurality of beams are transmitted. The network node further comprises a determining unit for determining RBS antenna weights for each of the plurality of beams based on the defined first communication power limit for each of the plurality of beams, such that communication power transmitted by each of the plurality of beams is below the first communication power limit in the first propagation path direction interval, when the plurality of beams are transmitted.

According to a third aspect, a computer program is provided comprising computer readable code means which when run in a network node causes the network node to perform the following steps: Obtaining information on an expected first propagation path direction interval between the RBS and UEs served by other neighboring RBSs; Obtaining information on an expected second propagation path direction interval between the RBS and served UEs; Defining a first communication power limit for each of a plurality of beams according to the obtained information on expected first and second propagation path direction intervals, the first limit being defined to suppress communication power in the first propagation path direction interval, when the plurality of beams are transmitted; and determining RBS antenna weights for each of the plurality of beams based on the defined first communication power limit for each of the plurality of beams, such that communication power transmitted by each of the plurality of beams is below the first communication power limit in the first propagation path direction interval, when the plurality of beams are transmitted.

The above method and apparatus may be configured and implemented according to different optional embodiments.

Further possible features and benefits of this solution will become apparent from the detailed description below.

BRIEF DESCRIPTION OF DRAWINGS

The invention is now described, by way of example, with reference to the accompanying drawings, in which.

DETAILED DESCRIPTION

In the following, embodiments for improving system performance in a wireless communication system using beam forming techniques for communicating between an RBS and UEs will be described. This may be achieved by exploiting knowledge about expected directions to served UEs and expected directions to interfered UEs, and, based on this knowledge, suppress communication power in the expected directions towards interfered UEs and amplify communication power in the expected directions towards served UEs.

Beam forming is a technique for directional signal transmission and/or reception. Below, the invention is described for an eNodeB in a Long Term Evolution, LTE, based system. Although, the RBS may be any type of RBS, such as a NodeB in a UMTS system or a Base Transceiver Station in a GSM system, or an eNodeB in an LTE base system. A UE may be any kind of wireless communication equipment, such as a mobile terminal, a tablet computer etc.

Beam forming is achieved by controlling the phase and amplitude of different signals transmitted from and/or received at spatially separated antenna elements. This can be done by for instance using an antenna array with multiple ports, or an active antenna with multiple sub-elements.

Figure 1:
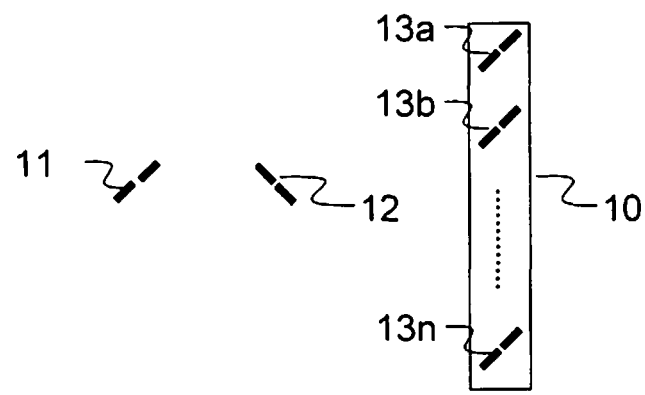
FIG. 1 is a schematic block diagram of an active antenna and its sub-elements.

An active antenna 10 consisting of multiple sub-elements 11, 12, 13a, 13b, 13n is illustrated in FIG. 1. A sub-element may in practice be realized by a physical device, as shown in FIG. 1. In FIG. 1 a first sub-element 11 has an extension direction orthogonal to the extension direction of a second sub-element 12 to illustrate potential orthogonal polarization directions. Further, an active antenna 10 is shown comprising N sub-elements 13a, 13b, 13n, where N could assume any positive integer value. In general, but not necessarily, all sub-elements of an active antenna are of the same polarization.

Some form of information about the radio channel, i.e. channel state information, is typically needed in order to perform efficient beam forming. The channel state information (CSI) is given either in explicit or implicit form. Explicit CSI contain gain and phase-difference between all pairs of transmit and receive antennas, and implicit CSI is typically given by spatial precoder recommendations from the UE.

Beam forming is commonly performed so as to maximize the received power at the UE. Certain beam forming techniques have other objectives in addition to boosting the received signal power, for instance to remove or reduce the interference. Two examples of such objectives are a so called zero-forcing criterion, and a so called signal to leakage plus noise objective function.

Beam forming using implicit CSI is rather limited in interference suppression capabilities since the complete channel is not known at the eNodeB. The straightforward way of performing beam forming would be to use the received CSI to determine which beam former to use, although adjustments of the beam forms to reduce the interference is conceivable.

A special type of implicit CSI is beam selection feedback. The eNodeB may transmit a plethora of spatially distinct probing signals that are beam formed in specific directions. A UE is then instructed to select the most preferred beam, for instance in terms of received signal power, and report this to the eNodeB. The advantage of this type of feedback is that the number of antenna elements can be decoupled from the CSI feedback; the UE need not estimate the full channel matrix. However, it should be pointed out that even if beam selection feedback is appropriate for a beam selection system, also called dynamic beam selection system, also other kinds of implicit CSI, or explicit CSI, can be used in a dynamic beam selection system. As previously stated one way to perform beam forming is to use active antennas. Furthermore, in the case that the active antenna is mounted in such a way that the sub-elements are spread out on a vertical axis one possible beam forming technique is 'elevation beam forming. Elevation beam forming means that the transmitted and/or received signal is directed in the elevation domain. This is done by using different phases and amplitudes for the different sub-elements of the active antenna such that at certain angles, relative the active antenna's vertical axis, the different signals experience constructive interference whereas at other angles they experience destructive interference.

Figure 2:
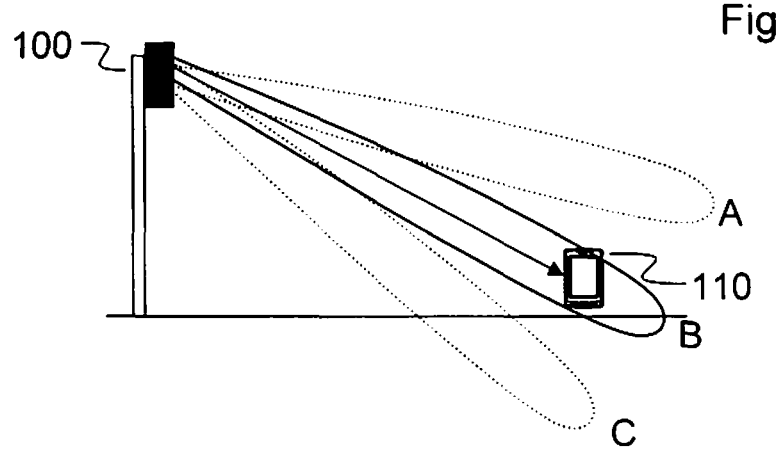
FIG. 2 is a schematic side view of a communication system using beam selection for communicating between an RBS and a UE.

One example, in the case of transmission, is illustrated in 2. FIG. 2 shows dynamic beam selection implemented for an eNodeB 100 in the elevation direction. The eNodeB 100 is able to transmit three different selection beams A, B and C formed differently such that they are directed in different elevation directions in a cell covered by the eNodeB 100. The eNodeB 100 is able to dynamically perform beam selection for a UE 110 between the three different beams A-C. Furthermore, when the eNodeB 100 is transmitting to the illustrated UE 110, the choice of using beam B has the advantage that the transmitted power will be directed in essentially the same direction as the propagation path between the eNodeB 110 and the UE 100. This hence leads to that the UE 110 receives a stronger signal from the eNodeB. In the case when a static beam forming technique is used, the eNodeB 110 would instead need to use one beam for all transmissions and therefore not be able to focus the transmitted power in the direction towards its UE of interest.

It should be emphasized that in a more general setting there can be any number of selection beams. In fact, the selection beams can even be created dynamically pointing in an arbitrary elevation direction and with an arbitrary shape (e.g., width), implying an infinite number of possible selection beams.

Figure 3:
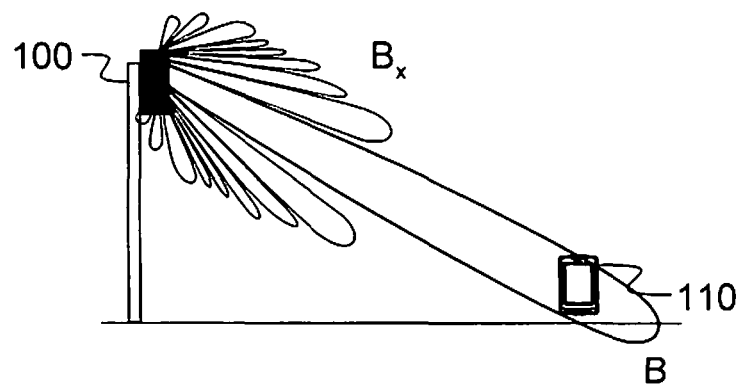
FIG. 3 is a schematic side view of a communication system using beam forming for communicating between an RBS and a UE, showing a main lobe and side lobes of a beam.

In FIG. 2 the beam forming patterns for different selection beams were illustrated as rather ideal beam shapes. This ideal shape is however not possible to implement in practice; in a practical system it is inevitable to have side lobes. In FIG. 3, beam B and its side lobes $B_x$ are shown. These side lobes are typically damaging for the system performance since they imply that power is emitted in unwanted directions. An important aspect when designing beam forms is therefore to consider the effect of the resulting side lobes.

Figure 4:
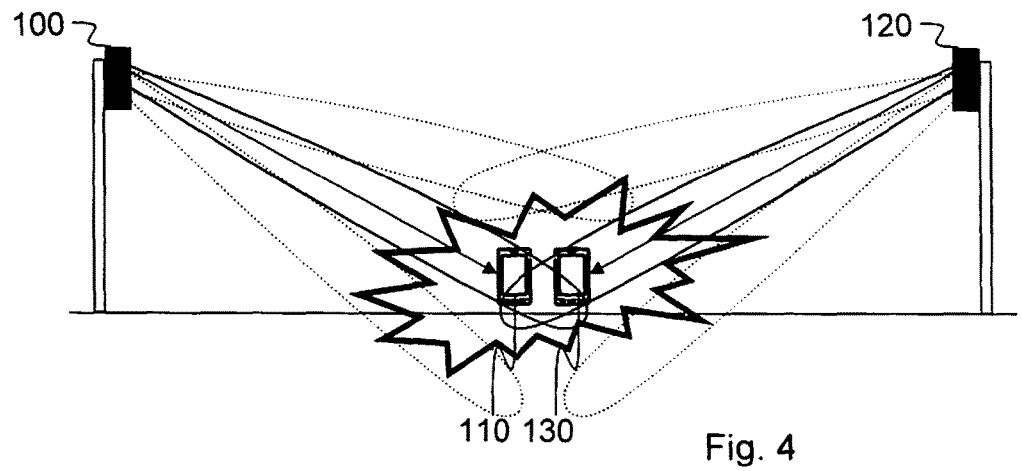
FIG. 4 is a schematic side view of a communication system using beam forming, illustrating interference to neighboring non-served UE.

Dynamic beam selection is a powerful tool for directing the transmitted power towards the UE of interest, and thereby increasing the received signal level. But there is also another aspect that needs to be taken into consideration to maximize system performance, this aspect is interference. The interference aspect is illustrated in FIG. 4. When the eNodeB 100 directs its transmitted power towards its served UE 110, the eNodeB may at the same time also direct the transmitted power towards another UE 130, which may be called a neighboring non-served UE, currently receiving a signal from another, neighboring eNodeB 120, covering a neighboring cell. Hence, eNodeB:s may cause interference to their neighboring cells when performing dynamic beam selection. This interference can be very harmful for the system. In fact, it is possible that the entire (system level) gain obtained from beam selection by increasing the received signal level disappears due to a simultaneous increase in interference towards a neighboring cell.

Embodiments of the present invention relates to mitigating interference in a communication system employing dynamic beam forming by means of designing selection beams. This is done by in the design of the selection beams consider both an expected second propagation path direction interval between the RBS and expected positions of served UEs as well as an expected first propagation path direction interval between the RBS and expected positions of UEs served by other neighboring RBSs. The design of the selection beams is then carried out in such a manner that a sufficient communication power level will be communicated in the expected second propagation path direction interval at the same time as a low communication power level will be communicated in the first propagation path direction interval. A communication power limit is defined in the expected second propagation path direction interval. The communication power limit is set to such a level that communication power is suppressed in the expected second propagation path direction interval. RBS antenna weights are determined such that the communication power level in the direction towards the expected positions of the UEs served by other neighboring RBSs is below the defined communication power limit.

Figure 5:
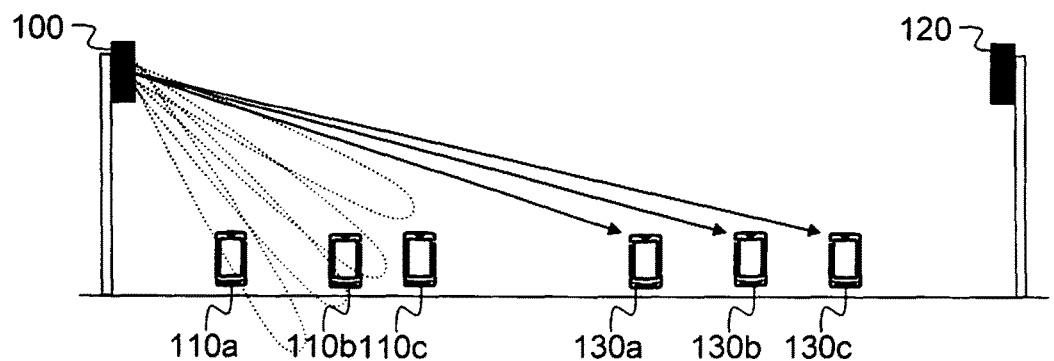
FIG. 5 is a schematic side view of another communication system using beam selection, illustrating expected propagation path directions to served UEs and to UEs served by other neighboring RBSs.

According to embodiments, prior knowledge is explored about expected caused interference corresponding to different expected propagation path direction intervals in the design of beam forming patterns. For instance, when performing dynamic elevation beam forming, emitted power in certain elevation angles tend to cause substantial interference to other UEs in the system, e.g., UEs outside of the present eNodeBs control, i.e. UEs served by other neighboring RBSs. This is illustrated in FIG. 5 where six UEs are shown in the system. The three left UEs 110a, 110b, 110c are assumed to be served by the left eNodeB 100, whereas the three right UEs 130a, 130b, 130c are assumed to be served by the right eNodeB 120. The left eNodeB 100 will use dynamic elevation beam forming in order to serve its UEs 110a, 110b, 110c. I.e. the left eNodeB 100 transmits selection beams (marked with dotted lines) in an expected propagation path direction towards the UEs 110a, 110b, 110c. However, while doing so it will also emit interference to the right UEs 130a, 130b, 130c in the expected propagation path directions corresponding to the dashed arrows towards the UEs 130a, 130b and 130c. It is herein recognized that it is beneficial to consider this effect already in the design of the beam forming patterns. It is pointed out that the illustrated served UEs 110a, 110b, 110c in FIG. 5 may symbolize expected positions of served UEs, and that the illustrated UEs served by other neighboring RBSs 130a, 130b, 130c, may symbolize expected positions of UEs served by other neighboring RBSs, and not necessarily existing UEs in the system. In fact, the illustrated UEs being expected positions of UEs may be an advantageous embodiment.

Figure 6:
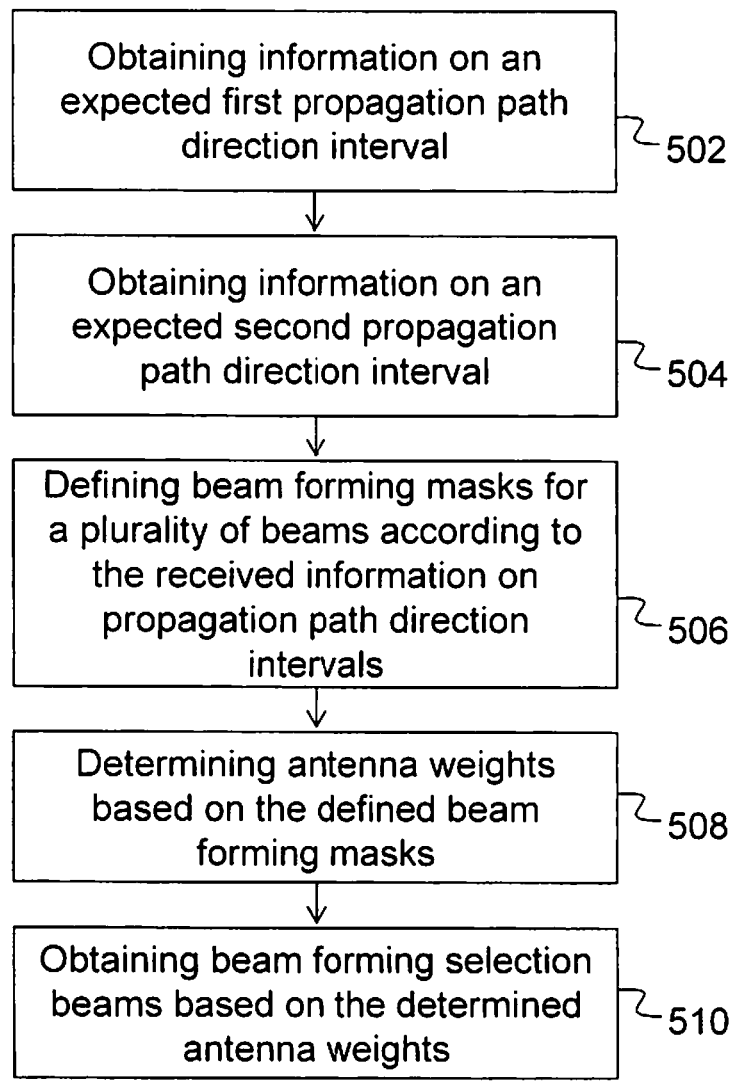
FIG. 6 is a flow chart illustrating a method in a network node, according to possible embodiments

FIG. 6 shows a flow chart of a method according to an embodiment. In this exemplary embodiment it is illustrated how an eNodeB 100, dynamically using elevation beam forming as shown in FIG. 5, can benefit from the proposed method in order to suppress the interference caused to UEs in neighboring cells while ensuring a sufficient level of received power for its served UEs.

In step 502, information regarding an expected first propagation path direction interval towards the served UEs 110a, 110b, 110c is obtained. The information may be radio propagation characteristics for downlink communication between the eNodeB 100 and the served UEs 110a, 110b, 110c. The information may include information on the downlink directions in which radio propagation paths are leaving the eNodeB 100 to the served UEs 110a, 110b, 110c. The information may also include the power carried by these propagation paths. In step 504, information regarding an expected second propagation path direction interval towards the UEs served by other neighboring RBSs 130a, 130b, 130c is obtained. The information may be radio propagation characteristics for downlink communication between the eNodeB 100 and the UEs served by other neighboring RBSs 130a, 130b, 130c. The information may include information on the downlink directions in which radio propagation paths leave the eNodeB 100 to the UEs served by other neighboring RBSs 130a, 130b, 130c. The information may also include the power carried by these propagation paths. The information regarding the first and second propagation path direction interval 502, 504 may be obtained or derived from the geometry of the deployment and sites, e.g. the geometry of the cells and the altitude position of the antennas, or it may alternatively be measured directly or indirectly as part of system operation. An example of an embodiment where the information on expected propagation path direction intervals, by means of expected angular intervals to served and interfered UEs, is derived from the site deployment is given below. Measurements for the expected first propagation path direction interval may be based on radio propagation characteristics for communication to the served UEs. The radio propagation characteristics may be radio channel measurements, e.g. on the reverse link, i.e. uplink, from which angular spectra of the expected first propagation path direction interval is derived. Measurements for the expected second propagation path direction interval may be based on radio propagation characteristics for communication to the UEs served by other neighboring RBSs, such as radio channel measurements, e.g. on the reverse link, i.e. uplink, from which angular spectra of the expected second propagation path direction interval is derived. In an embodiment, either the angular intervals or the angular spectra may be used as input to beam forming masks.

Figure 7:
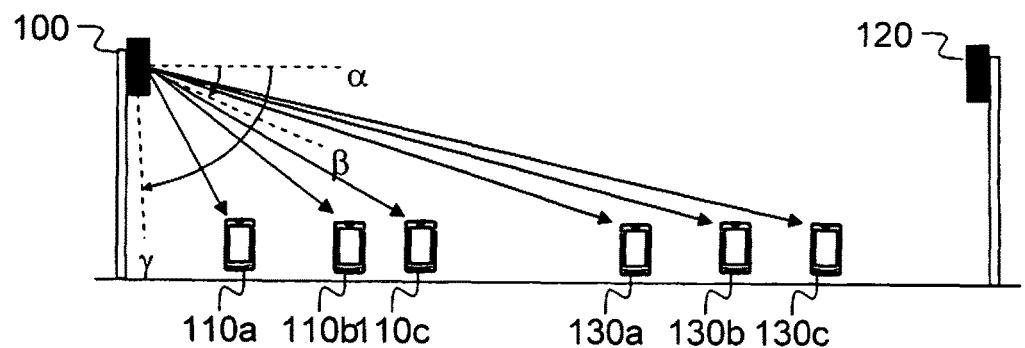
FIG. 7 is a schematic side view of another communication system using beam selection, illustrating expected propagation path direction intervals to served UEs and to UEs served by other neighboring RBSs.
Figure 8:
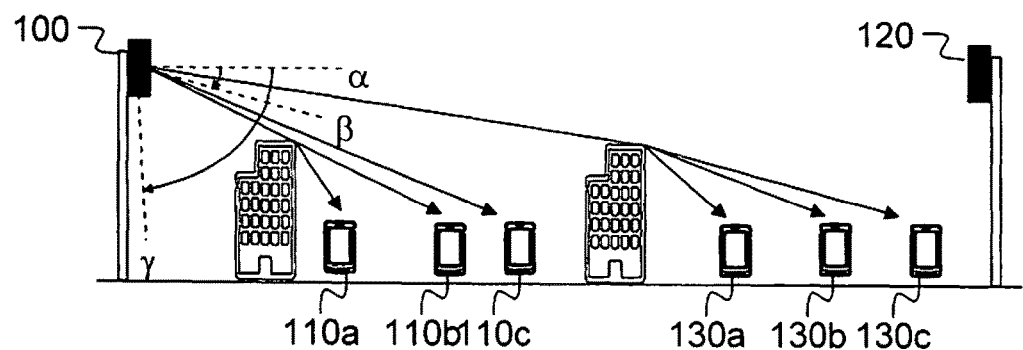
FIG. 8 is a schematic side view of another communication system using beam selection, illustrating expected propagation path direction intervals to served UEs and to UEs served by other neighboring RBSs in an urban area.

In one embodiment an analysis as illustrated in FIG. 7 is conducted for an eNodeB 100 in a given deployment. As in FIG. 5, it is assumed that the three left UEs 110a, 110b, 110c may illustrate expected positions for UEs served by the left eNodeB 100 whereas the three right UEs 130a, 130b, 130c may illustrate expected positions for UEs interfered by the said eNodeB 100, i.e. UEs that may be served by the neighboring eNodeB 120 and not the serving eNodeB 100. As illustrated in the figure there is typically a range of expected direction angles, or angular intervals, in where the interfered UEs 130a, 130b, 130c may be located, i.e. from α to β degrees, and a range of expected direction angles where the served UEs 110a, 110b, 110c may be located, i.e. β to γ degrees, and the purpose of the analysis is to estimate values on α, β and γ. Hence, the conducted analysis will through the resulting angles provide information on in which angles the eNodeB 100 will emit power to served UEs 110a, 110b, 110c (i.e. desirable signal) and in which angles the eNodeB 100 will emit interference (i.e. undesirable signal) to interfered UEs 130a, 130b, 130c. A range of expected direction angles may be an example of an expected propagation path direction interval. Although the example in FIG. 7 illustrates the expected propagation path directions between the eNodeB 100 and the served and interfered UEs as all lying in the line-of-sight plane, this does not necessarily have to be the case. In FIG. 8 a somewhat more complicated example is illustrated where all the expected propagation path directions are over rooftop propagations, this will naturally impact the angles α, β and γ, as illustrated in FIG. 8.

According to an embodiment, information of the expected first and second propagation path direction intervals may be obtained without the knowledge of the actual UE positions. Instead, the information may be obtained based on prior knowledge about the expected UE positions. For example, the information on the expected first propagation path direction interval may be obtained based on previous communication between served UEs 110a, 110b, 110c at the time when they were served by the eNodeB 100. Likewise, the information on the expected second propagation path direction interval may be obtained based on previous interfering communication from the eNodeB 100 to interfered UEs 130a, 130b, 130c at the time when they were interfered by signals from the eNodeB 100. Hence, in this way the analysis may be done beforehand and then exploited in an offline (long term) design of the beam forming patterns. The information may be based on statistical information on previous communication between served UEs/interfered UEs and the eNodeB 100.

There are multiple ways to conduct the previously mentioned analysis in order to obtain the angles α, β and γ. ☐In one embodiment the angles are estimated through a manual measurement at the given eNodeB. ☐In another embodiment the angles are estimated through an automatic measurement carried out by the system. In another embodiment the angles are estimated through an analytical analysis of the given deployment.

Returning to FIG. 6, the method of the embodiment also comprises defining 506 beam forming masks for a plurality of beams according to the obtained information on expected first and second propagation path direction intervals. The method further comprises determining 508 eNodeB antenna weights based on the defined beam forming masks. The method further comprises obtaining 510 beam forming selection beams based on the determined antenna weights. All embodiment steps except the step 510 of obtaining beam forming selection beams may be performed beforehand, for example in a start-up phase of the system. All steps except the step 510 of obtaining beam forming selection beams may also be performed in a network node different from the serving eNodeB 100.

When having obtained the different beam forming selection beams one would typically aim for designing a set of beam forming selection beams that together span the interval β to γ degrees in order to be able to serve all possible served UEs 110a, 110b, 110c. However, with the proposed embodiment method one should also ensure that every beam forming selection beam has low side lobes in the interval α to β degrees. This will hence lead to a low level of emitted power in the angles where interfered UEs 130a, 130b, 130c potentially are located and at the same time create a sufficient level of received power for the served UEs. The desired level of emitted power in different angular intervals may be a design parameter that is set a priori, or it may be based on load or interference levels measured in the system.

Figure 9A:
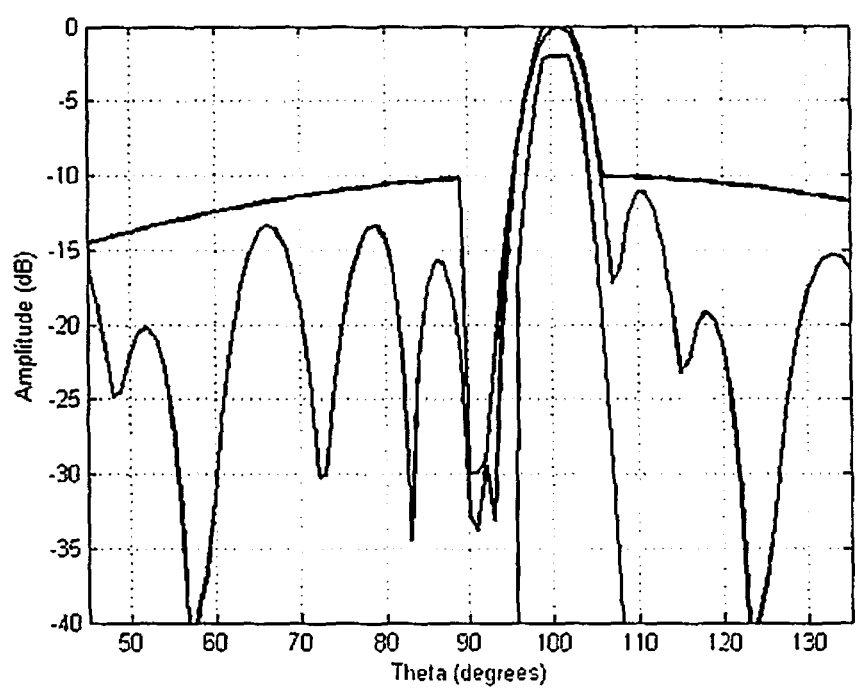
FIGS. 9a-9c are graphs illustrating beam forming masks and beam forming patterns for three different selection beams as amplitudes as a function of direction angels.
Figure 9B:
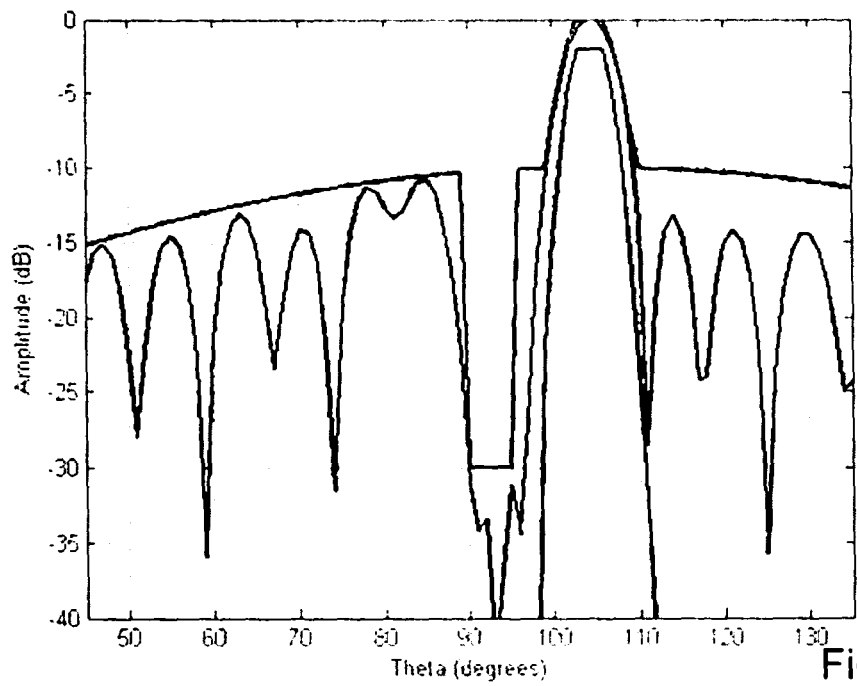
Figure 9C:
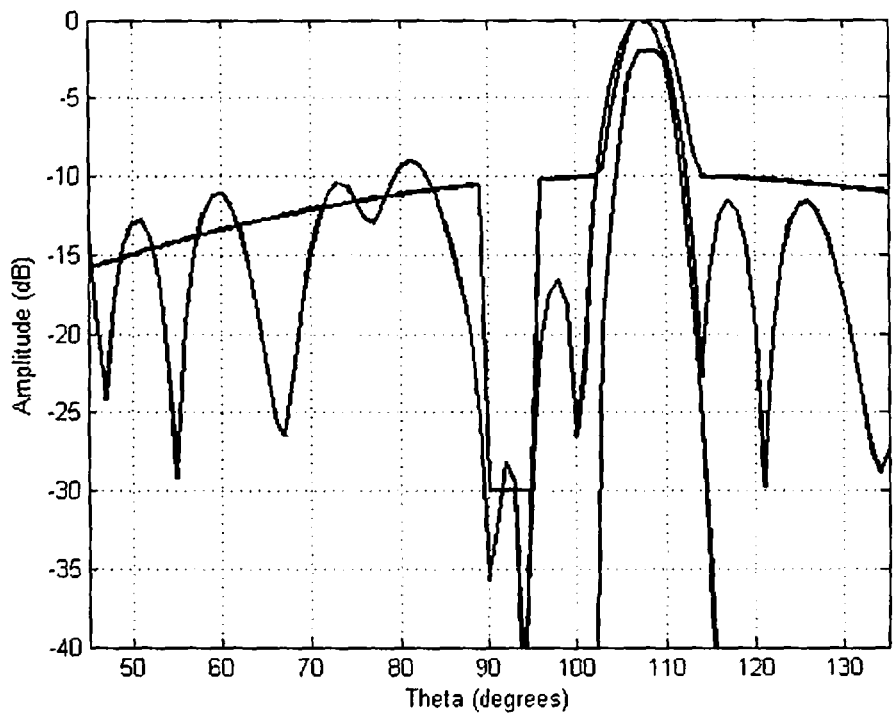

One exemplary embodiment is shown in FIG. 9a-c where it is assumed that α=90 degrees, β=95 degrees and γ=110 degrees (it is assumed that 90 degrees corresponds to the horizon and 180 degrees points into the ground). As can be seen, a set of three beam forming selection beams have been designed to cover the interval 95 to 110 degrees. A first beam covers mainly the direction around 100 degrees (FIG. 9a), a second beam covers mainly the direction around 105 degrees (FIG. 9b) and the third beam covers mainly the direction around 110 degrees (FIG. 9c). The uppermost curve in each figure corresponds to an upper beam forming mask. The upper beam forming mask sets an upper, or first, limit for communication power for a beam. The lowest curve in each figure corresponds to a lower beam forming mask. A lower beam forming mask sets a lower, or second, limit for communication power for a beam. The lower mask is designed to show the pointing direction of each beam. The middle curve, i.e. the curve between the lowest curve and the uppermost curve is a resulting pattern of the beam. The pattern should, if possible, lie in between the upper and the lower beam forming mask. As mentioned, the different beam forming selection beams have therefore been designed to have different pointing directions which are illustrated by the lower beam forming masks in the figures. At the same time, the beam forming selection beams have all shared the design objective to minimize the side lobe level in the interval 90 to 95 degrees. This is illustrated by the upper beam forming masks in the figures. As can be seen in the FIGS. 8a-c, all upper beam forming masks have a dip in the area between 90 and 95 degrees, which is the obtained direction interval for interfered UEs.

Given these set of beam forming masks, antenna weights can, through numerous different optimization methods as known in the art, be determined. In the example of FIG. 9a-c one such optimization has produced the three different beam forming patterns as illustrated by the middle lines in the figures. The resulting design is well suited for dynamic elevation beam forming serving UEs in the interval 95 to 110 degrees and at the same time cause a low level of interference in the interval 90 to 95 degrees.

There are multiple ways to conduct the previously mentioned analysis in order to define beam forming masks and determine antenna weights: Typically the interference is of less importance in a low load scenario than in a high load scenario. Therefore, in one embodiment the upper and/or lower beam forming masks are load dependent enabling a load dependent suppression of the caused interference by adjusting the mask. In one embodiment the masks are continuously updated based on system information such as time of the day, resource utilization, load etc. In one embodiment, the beam forming masks may be defined to cater for UE user behavior or number of UEs in a cell. UE User behavior may be behavior of a user of a UE. For example, if UE users in a cell normally move during day time e.g. are in offices during office hours, travelling in mornings and evenings etc. such usage behavior may be taken into consideration when designing beam forming patterns. E.g. different beam forming patterns may be used in mornings in comparison to at office hours. In a similar manner, beam forming patterns may be designed differently based on number of UEs in a cell, i.e. the load of the cell.

In one embodiment, the optimization algorithm notifies if it was not able to meet the requirement from the defined beam forming masks. The system may then modify the beam forming masks and perform a new optimization in order to determine appropriate antenna weights.

The targets of obtaining a certain pointing direction and at the same time have a low side lobe level in another direction may be conflicting. According to an embodiment, the masks may be adjusted in order to be able to meet both objectives. An example of this is illustrated in FIG. 9a where the upper beam forming mask has been adjusted in order to be able to achieve the desired pointing direction.

The determined antenna weights are then used in a beam selection system and may hence be used together with an active antenna. Hence, the determined antenna weights will create the beam forming selections beams.

Although there in the previous illustrated embodiments exist one interval with served UEs and one with interfered UEs there may in an more general embodiment exist multiple, non-adjacent, intervals with served and/or interfered UEs. Hence, in such a case there will exist multiple sets of α, β and γ☐ parameters and the previous embodiments may be modified accordingly.

In the previous embodiments, a method was described for downlink transmission. It is here recognized that the embodiments are equally applicable for transmission in the uplink. In the uplink antenna receiver weights may be determined in the same manner as antenna transmitter weights for the DL, and then used for receiving transmissions from the UEs.

Figure 10:
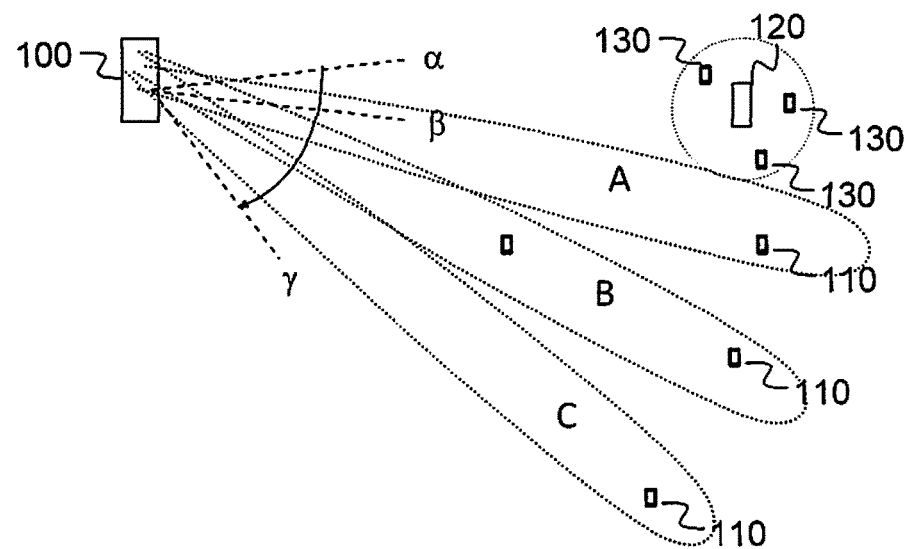
FIG. 10 is a schematic top view of another communication system using beam selection, which view illustrates azimuth directions to served UEs and to UEs served by other neighboring RBSs.

Although the embodiments have been described in the context of elevation beam forming the proposed method is not restricted to the elevation domain. In FIG. 10 a macro site comprising a macro eNodeB 100 and a pico site comprising a pico eNodeB 120 are shown from the above. As can be seen the macro eNodeB 100 is able to perform dynamic beam forming in the azimuth direction when serving its UEs 110 whereas the pico eNodeB 120 has a fixed beam forming pattern designed for serving its UEs 130 in an area close to the pico eNodeB 120.

The proposed method could here be applied designing the azimuth beam forming selection beams such that they generate a low level of emitted power in the direction angle interval α-β corresponding to the direction of the pico at the same time as they create a sufficient level of emitted power in the different beam forming directions in the direction angle interval β-γ.

Figure 11:
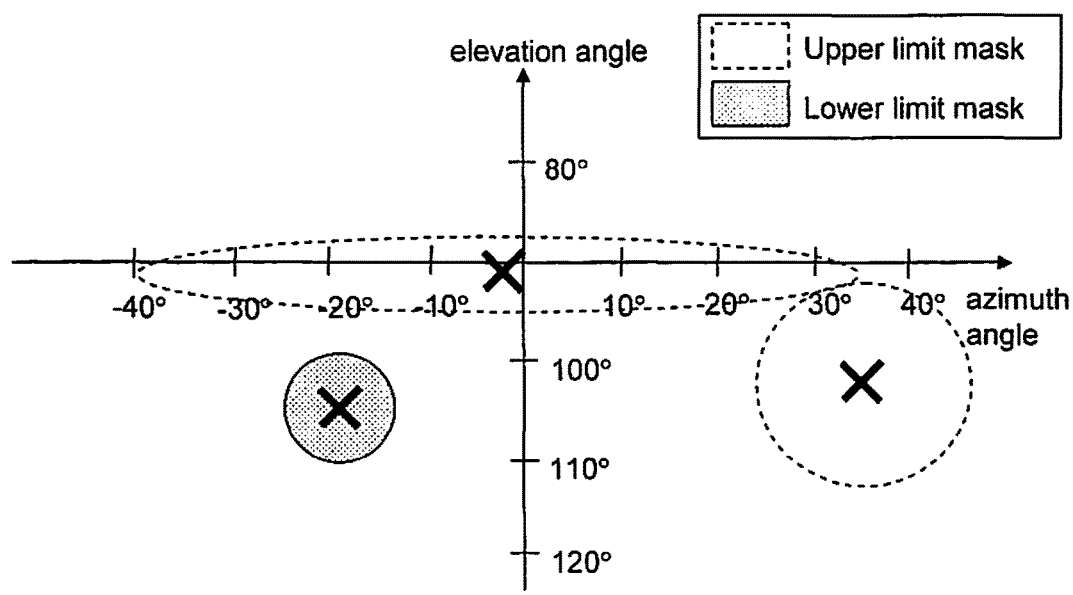
FIG. 11 is a schematic diagram of another communication system using beam selection, which view illustrates directions to served UEs and to UEs served by other neighboring RBSs in both elevation and azimuth directions.

In another embodiment, an analysis is carried out jointly for the elevation and azimuth domain. FIG. 11 shows an example of how the physical propagation characteristics at a particular antenna position may translate into a beam forming mask to be used in the design for one of the selection beams. The areas around the positions of the identified neighboring sites are marked with dashed ellipsoids representing areas where an upper limit mask is used that sets an upper, maximum, limit for the beam forming gain in those directions. One elipsoide is positioned at an area covered by a neighbouring macro RBS, in the figure marked with an "X" at approximately azimuth angle—5°, elevation angle 90°. Another elipsoide is positioned at an area covered by a neighbouring pico site, the pico RBS being marked in the figure with an "X" at approximately azimuth angle 35°, elevation angle 100°. Similarly, the area around the selection beam pointing direction is marked with a dotted area. The selection beam pointing direction is marked with an "X" in the figure at approximately azimuth angle −20°, elevation angle 115°. At the dotted area a lower limit mask is used that sets a lower, minimum, limit for the beam forming gain in those directions, i.e. with a constraint to enforce that the beam forming gain remains above a specified level in those directions. Only one selection beam is marked in the figure. Other selection beams will have different pointing directions than the selection point that has been marked in the figure. However, even though they have different pointing directions, the areas with an upper limit mask, i.e. where the gain or communication power, is suppressed below the limit of the upper limit mask, will be the same for the different selection beams. Note that the geometrical shapes of the masks could be of general type, such as ellipsoid, rectangular, polygons, or other areas that could be parameterized in a structured manner. Note also that the masks may consist of multiple geometrical shapes that limit the maximum and or minimum beam forming gains. Furthermore, it should also be noted that although the masks in the example coincide with the directions of the physical locations for the different sites this it not necessarily the case; a mask may also arise from a strong scatterer in some direction.

The invention provides a novel solution for mitigating interference in a communications system by means of designing beam forms. This is done by incorporating both expected link performance as well as expected interference impact when designing a certain beam form. This advantage can be achieved without any additional interaction between eNodeBs of different antenna sites.

Figure 12:
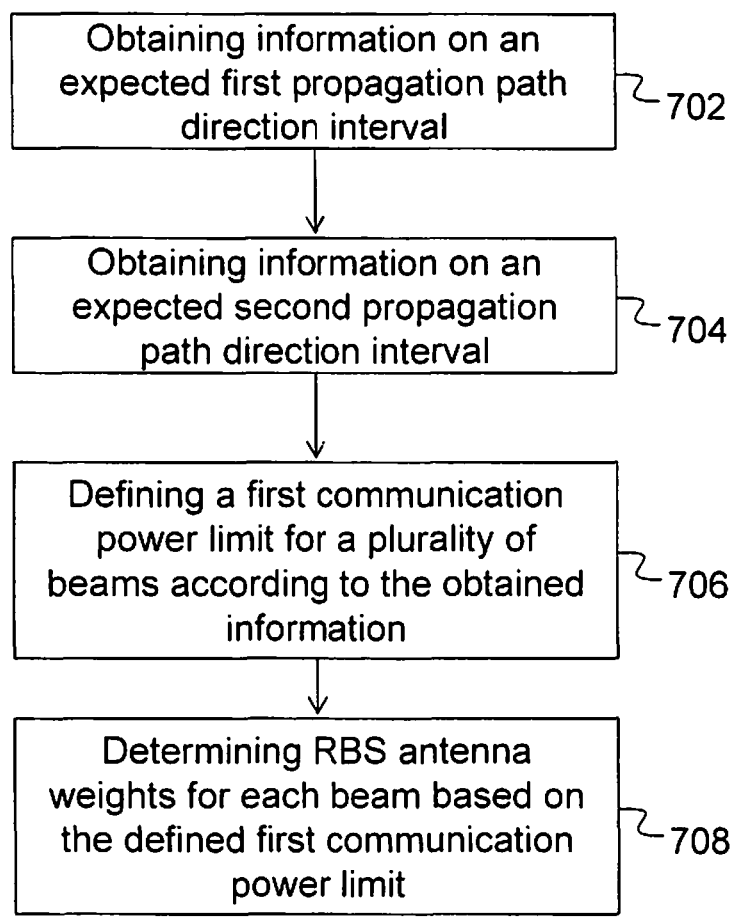
FIG. 12 is a flow chart illustrating a method in a network node, according to possible embodiments.

A method according to an embodiment is described as a flow chart in FIG. 12. According to the embodiment, a method performed by a network node is described for controlling communication between an RBS 100, and user equipments, UEs, in a wireless communication system. The RBS has multiple antennas and uses beam forming when communicating with the UEs. The method comprises: obtaining 702 information on an expected first propagation path direction interval between the RBS 100 and UEs served by other neighboring RBSs 130; 130a, 130b, 130c. The method further comprises obtaining 704 information on an expected second propagation path direction interval between the RBS 100 and served UEs 110; 110a, 110b, 110c. The method further comprises defining 706 a first communication power limit for each of a plurality of beams according to the obtained information on expected first and second propagation path direction intervals, the first limit being defined to suppress communication power in the first propagation path direction interval, when the plurality of beams are transmitted. The method further comprises determining 708 RBS antenna weights for each of the plurality of beams based on the defined first communication power limit for each of the plurality of beams, such that communication power transmitted by each of the plurality of beams is below the first communication power limit in the first propagation path direction interval, when the plurality of beams are transmitted. Thereby it is possible to design beam patterns from selection beams such that beam power is suppressed in a direction from the RBS where there are normally UEs served by other neighboring RBSs that may be interfered from the signals sent by the RBS. As a consequence, interference problems at UEs served by other neighboring RBSs may be lowered, and system performance may be improved.

An expected propagation path direction interval between the RBS and UEs may be an interval of propagation path directions out from the RBS in case of DL transmission and an interval of incoming propagation path directions towards the RBS in case of UL transmission. A propagation path direction interval may be the same as a spatial direction interval to a UE, according to a straight line from the RBS to a UE. A propagation path direction interval may be one interval of directions, or it may be two or more intervals with gaps in between each interval.

An expected first propagation path direction interval may be a direction interval in which it is expected to be UEs served by other neighboring RBSs. I.e. it does not have to be any actual present UEs in the direction interval when the direction interval is obtained, but when the wireless communication system is running it is expected to be UEs served by other neighboring RBSs in this direction interval, if any. An expected second propagation path direction interval may be a direction interval in which it is expected to be served UEs. I.e. it does not have to be any actual present UEs in the direction interval when the direction interval is obtained, but when the wireless communication system is running it is expected to be served UEs in this direction interval, if any.

A served UE is a UE that is served by the RBS. A UE served by another neighboring RBS is a UEs that is served by another RBS that may be a neighbour to the RBS serving served UEs, or served by an RBS that serves a cell that may be a neighbor cell to the cell served by the serving RBS. The UE served by another neighboring RBS may also be called a neighboring non-served UE. The UEs served by other neighboring RBSs may also be called interfered UEs, i.e. UEs interfered by signals from the serving RBS.

The information on propagation path direction intervals may be determined by the network node or received from another node in the system. The plurality of beams may be selection beams from which the UE may be instructed to select one selection beam for the communication with the RBS. The controlled communication may be uplink communication and/or downlink communication.

According to an embodiment, the method further comprises defining a second communication power limit for communication power transmitted in the obtained second propagation path direction interval. Further, the determining 708 of RBS antenna weights further comprises determining RBS antenna weights for each of the plurality of beams such that the communication power in the second propagation path direction interval is above the second limit, when the plurality of beams are transmitted. Thereby, a limit is also set for transmission towards served UEs, thereby ensuring that the transmitted power towards served UEs is satisfactory.

According to an embodiment, the first communication power limit is set such that communication power in the first propagation path direction interval is suppressed by approximately 15-30 dB.

According to another embodiment, the first communication power limit is defined to be essentially the same for each of the plurality of beams. Thereby, the communication power towards UEs served by other neighboring RBSs is well-controlled. Also, the configuration of beams is simplified.

According to yet another embodiment, the expected second propagation path direction interval is divided into a plurality of sub-intervals, and wherein the antenna weights are determined 708 such that one of the plurality of beams has a maximum communication power in one of the plurality of sub-intervals. Thereby it is defined that the beams each is directed to a sub-interval of the second propagation path direction interval. The beams may have a maximum communication power in separate sub-intervals such that the plurality of beams thereby in total cover all of the sub-intervals.

According to still another embodiment, the information on expected first and second propagation path direction intervals may be obtained based on previous communication between served UEs and the RBS and between UEs served by other neighboring RBSs and the RBS. Thereby, expected propagation path direction intervals can be determined at certain occasions in the system, for example at set up, or at maintenance intervals etc. In any case, the expected propagation path direction intervals may be determined before the actual time when beams are sent, i.e. the intervals may be determined already at design of the beam forming patterns. The information on expected propagation path direction intervals may be based on e.g. statistical information.

According to another embodiment, the information on expected first and second propagation path direction intervals may be based on radio propagation characteristics for communication between the RBS and served UEs, and for communication between the RBS and UEs served by other neighboring RBSs. Radio propagation characteristics may be based on measurements performed on downlink communication or on uplink communication. From the measurements, angular spectra of served UE signals and interfered UE signals may be derived.

According to yet another embodiment, the information on expected first and second propagation path directions intervals is based on geographical positions of the served UEs and the UEs served by other neighboring RBSs, or on geographical areas in which served UEs and UEs served by other neighboring RBSs tend to be positioned. By using information of where the UEs are positioned or where served and neighboring UEs tend to be positioned, propagation path directions between the RBS and the UEs may be easily obtained.

According to yet another embodiment, the information on expected first and second propagation path direction intervals is based on geometrical information of the RBS and of a cell covered by the RBS. For example, by knowing the altitude position of the antenna elements of the RBS and by knowing where the cell border is approximately situated, first and second propagation path direction intervals may be calculated. Such a method provides a fast and easy to handle information of approximate direction intervals where served UEs are expected to be (inside the cell border) and where UEs served by other neighboring RBSs are expected to be (outside the cell border).

According to yet another embodiment, the obtaining 702 of information on expected first propagation path direction intervals comprises obtaining a range of expected first direction angles towards the UEs served by other neighboring RBSs, and the obtaining 704 of information on expected second propagation path direction intervals comprises obtaining a range of expected second direction angles towards the served UEs. The first direction angles and the second direction angles may be elevation angles and/or azimuth angles.

According to another embodiment, the information on expected first and second propagation path direction interval is received from the RBS that applies the antenna weights or from another network node.

According to yet another embodiment, the information on expected first and second propagation path direction interval is received from an operations support system or network operations center.

Figure 13:
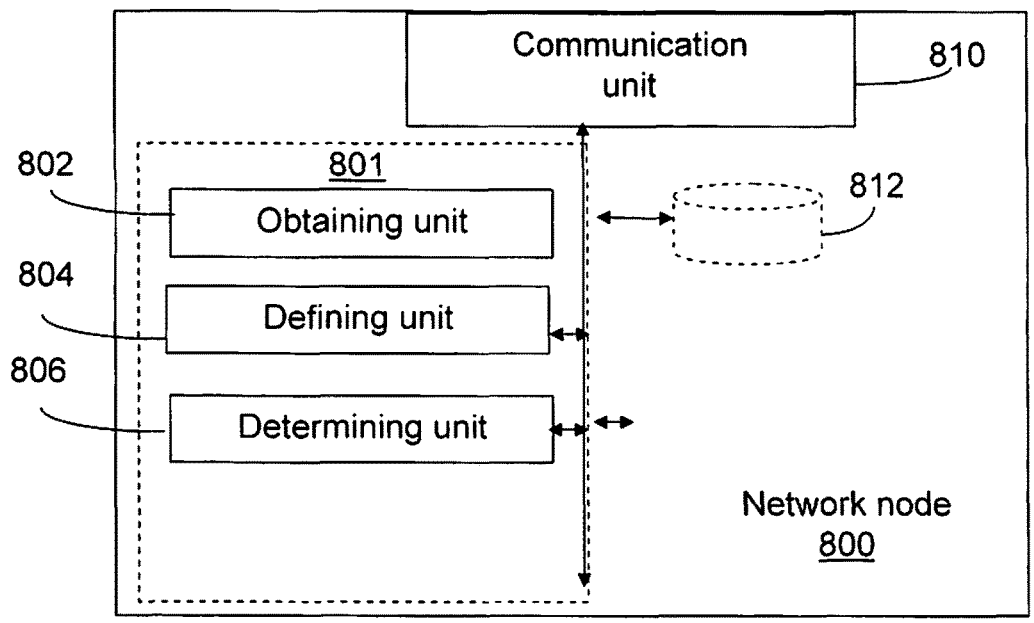
FIG. 13 is a schematic block diagram illustrating a network node according to possible embodiments.

FIG. 13 shows a network node 800 according to an embodiment of the invention configured for controlling communication between an RBS and user equipments in a wireless communication system. The RBS has multiple antennas and is arranged to use beam forming when communicating with the UEs. The network node comprises an obtaining unit 802 for obtaining information on an expected first propagation path direction interval between the RBS and served UEs, and for obtaining information on an expected second propagation path direction interval between the RBS and UEs served by other neighboring RBSs. The network node further comprises a defining unit 804 for defining a first communication power limit for each of a plurality of beams according to the obtained information on expected first and second propagation path direction intervals, the first limit being defined to suppress communication power in the first propagation path direction interval, when the plurality of beams are transmitted. The network node further comprises a determining unit 806 for determining RBS antenna weights for each of the plurality of beams based on the defined first communication power limit for each of the plurality of beams, such that communication power transmitted by each of the plurality of beams is below the first communication power limit in the first propagation path direction interval, when the plurality of beams are transmitted.

The network node may be a serving RBS, i.e. the RBS transmitting the plurality of beams, or another RBS or another network node, which performs the design of the beams and then delivers the designed beams, or the antenna weights to the serving RBS.

The network node 800 may further comprise a communication unit 810, which may be considered to comprise conventional means for communication from and/or to other nodes of the system. The apparatus network node 800 may further comprise one or more storage units or memories 812.

According to another embodiment, the defining unit 804 is further configured to define a second communication power limit for communication power transmitted in the obtained second propagation path direction interval. Further, the determining unit 806 is configured to determine RBS antenna weights for each of the plurality of beams such that the communication power in the second propagation path direction interval is above the second limit, when the plurality of beams are transmitted.

According to yet another embodiment, the first communication power limit is defined to be essentially the same for each of the plurality of beams.

According to yet another embodiment, the expected second propagation path direction interval is divided into a plurality of sub-intervals. Further, the determining unit 806 is configured to determine the antenna weights such that one of the plurality of beams has a maximum communication power in one of the plurality of sub-intervals.

According to yet another embodiment, the obtaining unit 802 is configured to obtain the information on expected first and second propagation path direction intervals based on previous communication between served UEs and the RBS and between UEs served by other neighboring RBSs and the RBS.

According to yet another embodiment, the obtaining unit 802 is configured to obtain the information on expected first and second propagation path direction intervals based on radio propagation characteristics for communication between the RBS and served UEs, and for communication between the RBS and UEs served by other neighboring RBSs.

According to yet another embodiment, the obtaining unit 802 is configured to obtain the information on expected first and second propagation path directions intervals based on geographical positions of the served UEs and the UEs served by other neighboring RBSs, or on geographical areas in which served UEs and UEs served by other neighboring RBSs tend to be positioned.

According to yet another embodiment, the obtaining unit 802 is configured to obtain information on expected first and second propagation path direction intervals based on geometrical information of the RBS and of a cell covered by the RBS.

According to yet another embodiment, the obtaining unit 802 is arranged to obtain information on expected first propagation path direction intervals by obtaining a range of expected first direction angles towards the UEs served by other neighboring RBSs. Further, the obtaining unit 802 is arranged to obtain information on expected second propagation path direction intervals by obtaining a range of expected second direction angles towards the served UEs.

According to yet another embodiment, the first direction angles and the second direction angles are elevation angles and/or azimuth angles.

The obtaining unit 802, the defining unit 804 and the determining unit 806 may be arranged in an arrangement 801. The arrangement 801 could be implemented e.g. by one or more of: a processor or a micro processor and adequate software and storage therefore, a Programmable Logic Device (PLD) or other electronic component(s)/processing circuit(s) configured to perform the actions, or methods, mentioned above.

Figure 14:
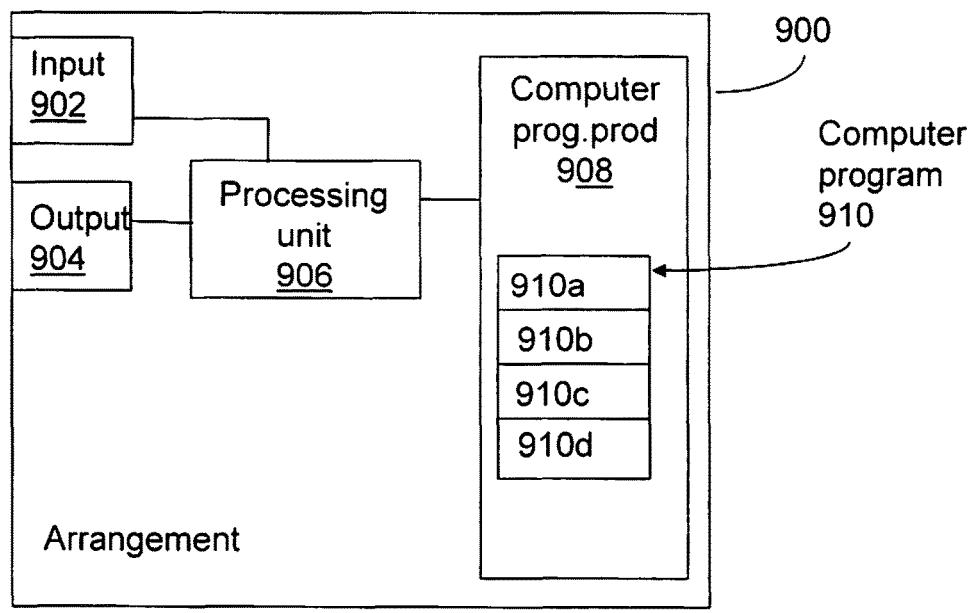
FIG. 14 is a schematic block diagram illustrating an arrangement in more detail, according to further possible embodiments.

FIG. 14 schematically shows an embodiment of an arrangement 900 for use in a network node 800, which also can be an alternative way of disclosing an embodiment of the arrangement 801 in a network node 800 illustrated in FIG. 12. Comprised in the arrangement 900 is a processing unit 906, e.g. with a Digital Signal Processor (DSP). The processing unit 906 may be a single unit or a plurality of units to perform different actions of procedures described herein. The arrangement 900 may also comprise an input unit 902 for receiving signals from other entities, and an output unit 904 for providing signal(s) to other entities. The input unit 902 and the output unit 904 may be arranged as an integrated entity.

Furthermore, the arrangement 900 comprises at least one computer program product 908 in the form of a non-volatile or volatile memory, e.g. an Electrically Erasable Programmable Read-only Memory (EEPROM), a flash memory, a disk drive or a Random-access memory (RAM). The computer program product 908 comprises a computer program 910, which comprises code means, which when executed in the processing unit 906 in the arrangement 900 causes the arrangement 801 and/or the network node 800 to perform the actions of any of the procedures described earlier in conjunction with FIG. 12.

The computer program 910 may be configured as a computer program code structured in computer program modules. Hence, in an exemplifying embodiment, the code means in the computer program 910 of the arrangement 900 comprises a first obtaining module 910a for obtaining information on an expected first propagation path direction interval between the RBS and UEs served by other neighboring RBSs. The code means further comprises a second obtaining module 910b for obtaining information on an expected second propagation path direction interval between the RBS and served UEs. The code means further comprises a defining module 910c for defining a first communication power limit for each of a plurality of beams according to the obtained information on expected first and second propagation path direction intervals, the first limit being defined to suppress communication power in the first propagation path direction interval, when the plurality of beams are transmitted. The code means further comprises a determining module 910d for determining RBS antenna weights for each of the plurality of beams based on the defined first communication power limit for each of the plurality of beams, such that communication power transmitted by each of the plurality of beams is below the first communication power limit in the first propagation path direction interval, when the plurality of beams are transmitted.

The acts which have above been described as being implemented or executed by a processor may be performed by any suitable machine. The machine may take the form of electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform may comprise, in addition to a processor(s), a memory section, which in turn can comprise random access memory; read only memory; an application memory, a non-transitory computer readable medium which stores, e.g., coded non instructions which can be executed by the processor to perform acts described herein; and any other memory such as cache memory, for example. Another example platform suitable is that of a hardware circuit, e.g., an application specific integrated circuit, ASIC, wherein circuit elements are structured and operated to perform the various acts described herein.

Although the description above contains much specificity, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

The invention claimed is:

1. A method performed by a network node for controlling communication between a radio base station (RBS) and user equipments (UEs) in a wireless communication system, wherein the RBS has multiple antennas and wherein the RBS uses beam forming when communicating with the UEs, the method comprising:
    obtaining information on an expected first propagation path angular interval between the RBS and UEs served by other neighboring RBSs,
    obtaining information on an expected second propagation path angular interval between the RBS and served UEs;
    defining a first communication power limit for each of a plurality of beams according to the obtained information on expected first and second propagation path angular intervals, the first communication power limit being defined to suppress communication power in the expected first propagation path angular interval, when the plurality of beams is transmitted; and
    determining RBS antenna weights for each of the plurality of beams based on the defined first communication power limit for each of the plurality of beams, such that communication power transmitted by each of the plurality of beams is below the first communication power limit in the expected first propagation path angular interval, when the plurality of beams is transmitted.

2. The method according to claim 1, further comprising: defining a second communication power limit for communication power transmitted in the expected second propagation path angular interval, and wherein the determining of RBS antenna weights further comprises determining RBS antenna weights for each of the plurality of beams, such that the communication power in the expected second propagation path angular interval is above the second communication power limit, when the plurality of beams is transmitted.

3. The method according to claim 1, wherein the first communication power limit is defined to be essentially the same for each of the plurality of beams.

4. The method according to claim 1, wherein the expected second propagation path angular interval is divided into a plurality of sub-intervals, and wherein the RBS antenna weights are determined such that one of the plurality of beams has a maximum communication power in one of the plurality of sub-intervals.

5. The method according to claim 1, wherein the information on expected first and second propagation path angular intervals is obtained based on previous communication between served UEs and the RBS and between UEs served by other neighboring RBSs and the RBS.

6. The method according to claim 1, wherein the information on expected first and second propagation path angular intervals is based on radio propagation characteristics for communication between the RBS and served UEs, and for communication between the RBS and neighboring non-served UEs.

7. The method according to claim 1, wherein the information on the expected first and second propagation path angular intervals is based on geographical positions of the served UEs and the UEs served by other neighboring RBSs, or on geographical areas in which served UEs and UEs served by other neighboring RBSs tend to be positioned.

8. The method according to claim 1, wherein the information on the expected first and second propagation path angular intervals is based on geometrical information of the RBS and of a cell covered by the RBS.

9. The method according to claim 1, wherein the obtaining of information on the expected first propagation path angular intervals comprises obtaining a range of expected first direction angles towards the UEs served by other neighboring RBSs, and the obtaining of information on the expected second propagation path angular intervals comprises obtaining a range of expected second direction angles towards the served UEs.

10. The method according to claim 9, wherein the expected first direction angles and the expected second direction angles are at least one of elevation angles and azimuth angles.

11. A network node configured to control communication between a radio base station (RBS) and user equipments (UEs) in a wireless communication system, wherein the RBS has multiple antennas and wherein the RBS is configured to use beam forming when communicating with the UEs, the network node comprising:

an obtaining unit for obtaining information on an expected first propagation path angular interval between the RBS and served UEs, and for obtaining information on an expected second propagation path angular interval between the RBS and UEs served by other neighboring RBSs;

a defining unit for defining a first communication power limit for each of a plurality of beams according to the obtained information on the expected first and second propagation path angular intervals, the first communication power limit being defined to suppress communication power in the expected first propagation path angular interval, when the plurality of beams is transmitted; and a determining unit for determining RBS antenna weights for each of the plurality of beams based on the defined first communication power limit for each of the plurality of beams, such that communication power transmitted by each of the plurality of beams is below the first communication power limit in the expected first propagation path angular interval, when the plurality of beams is transmitted.

12. The network node according to claim 11, wherein the defining unit is further configured to define a second communication power limit for communication power transmitted in the expected second propagation path angular interval, and wherein the determining unit is further configured to determine the RBS antenna weights for each of the plurality of beams such that the communication power in the expected second propagation path angular interval is above the second limit, when the plurality of beams is transmitted.

13. The network node according to claim 11, wherein the first communication power limit is defined to be essentially the same for each of the plurality of beams.

14. The network node according to claim 11, wherein the expected second propagation path angular interval is divided into a plurality of sub-intervals, and wherein the determining unit is configured to determine the RBS antenna weights such that one of the plurality of beams has a maximum communication power in one of the plurality of sub-intervals.

15. The network node according to claim 11, wherein the obtaining unit is configured to obtain the information on the expected first and second propagation path angular intervals based on previous communication between served UEs and the RBS and between UEs served by other neighboring RBSs and the RBS.

16. The network node according to claim 11, wherein the obtaining unit is configured to obtain the information on the expected first and second propagation path angular intervals based on radio propagation characteristics for communication between the RBS and served UEs, and for communication between the RBS and UEs served by other neighboring RBSs.

17. The network node according to claim 11, wherein the obtaining unit is configured to obtain the information on the expected first and second propagation path angular intervals based on geographical positions of the served UEs and the UEs served by other neighboring RBSs, or on geographical areas in which served UEs and UEs served by other neighboring RBSs tend to be positioned.

18. The network node according to claim 11, wherein the obtaining unit is configured to obtain the information on the expected first and second propagation path angular intervals based on geometrical information of the RBS and of a cell covered by the RBS.

19. The network node according to claim 11, wherein the obtaining unit is configured to obtain the information on the expected first propagation path angular intervals by obtaining a range of expected first direction angles towards the UEs served by other neighboring RBSs, and to obtain information on expected second propagation path angular intervals by obtaining a range of expected second direction angles towards the served UEs.

20. The network node according to claim 19, wherein the expected first direction angles and the expected second direction angles are at least one of elevation angles and azimuth angles.

21. A non-transitory computer-readable medium storing a computer program comprising program instructions that, when executed by a processor of a network node that is configured to control communication between a radio base station (RBS) and user equipments (UEs) in a wireless communication system, wherein the RBS has multiple antennas and wherein the RBS is configured to use beam forming when communicating with the UEs, configures the network node to:

obtain information on an expected first propagation path angular interval between the RBS and UEs served by other neighboring RBSs;

obtain information on an expected second propagation path angular interval between the RBS and served UEs;

define a first communication power limit for each of a plurality of beams according to the obtained information on expected first and second propagation path angular intervals, the first limit being defined to suppress communication power in the expected first propagation path angular interval, when the plurality of beams is transmitted; and determine RBS antenna weights for each of the plurality of beams based on the defined first communication power limit for each of the plurality of beams, such that communication power transmitted by each of the plurality of beams is below the first communication power limit in the expected first propagation path angular interval, when the plurality of beams is transmitted.

* * * * *